United States Patent [19]
Kim

[11] Patent Number: 6,036,287
[45] Date of Patent: Mar. 14, 2000

[54] PORTABLE COMPUTER WITH ENDURANCE AGAINST SHOCK

[75] Inventor: Young-Won Kim, Seoul, Rep. of Korea

[73] Assignee: SamSung Electronics Co., Ltd., Suwon, Rep. of Korea

[21] Appl. No.: 09/170,031

[22] Filed: Oct. 13, 1998

[30] Foreign Application Priority Data

Oct. 13, 1997 [KR] Rep. of Korea ...................... 97-52250

[51] Int. Cl.⁷ .................................................. A47B 81/00
[52] U.S. Cl. ......................... 312/223.2; 108/27; 206/521; 220/732
[58] Field of Search ............................... 312/352, 351.1, 312/223.2; 108/27; 206/521; 220/632, 730, 732

[56] References Cited

U.S. PATENT DOCUMENTS

| | | | |
|---|---|---|---|
| 2,787,407 | 4/1957 | Lang | 220/632 X |
| 3,355,049 | 11/1967 | Nolan et al. | 220/632 X |
| 3,587,700 | 6/1971 | Mauer | 220/732 |
| 3,836,043 | 9/1974 | Levin | 220/732 X |
| 3,963,226 | 6/1976 | Jankowski, Jr. | 220/632 X |
| 4,817,902 | 4/1989 | Mason | 108/27 X |
| 5,401,091 | 3/1995 | Landry | 220/732 X |

*Primary Examiner*—Peter M. Cuomo
*Assistant Examiner*—Stephen Vu
*Attorney, Agent, or Firm*—Robert E. Bushnell, Esq.

[57] ABSTRACT

The present invention relates to a portable computer with endurance against shock by attachment of a shock-absorber to the portable computer. The external shock to the portable computer during transport is absorbed by a shock-absorber which is attached to the portable computer so as to cover an external case, an edge part of a cover case of the external case, and an established area of a main body case.

15 Claims, 2 Drawing Sheets

6,036,287

PORTABLE COMPUTER WITH ENDURANCE AGAINST SHOCK

CLAIM OF PRIORITY

This application makes reference to, incorporates the same herein, and claims all benefits accruing under 35 U.S.C. §119 from my application entitled Portable Computer Resisting to Impact filed with the Korean Industrial Property Office on Oct. 13, 1997 and there duly assigned Serial No. P97-52250 by that Office.

BACKGROUND OF THE INVENTION

1. Technical Field

The present invention relates to a portable computer with the endurance against shock and, more particularly, to a portable computer, to which a shock-absorber is attached in order to with stand external shock conveyed to the external case.

2. Related Art

Generally speaking, personal computers can be classified as desktop computers or portable computers. A desktop computer is intended to be used at a fixed place, while a portable computer is designed to be moved to and used at remote location.

Accordingly, a portable computer is developed and supplied in small size and with convenience and portability, and it appears in the form of a notebook computer or a hand held computer.

The portable computer is designed in such a size as to enable a user to control it simply by hand. Particularly it can be conveniently used when it is carried from place to place while, at the same time, offering also the general function of a desktop computer.

Accordingly, a portable computer is not used regularly in a single place, but is moved form place to place. Thus, a portable computer can experience shocks more frequently than desktop computer.

Therefore, errors can occur in the interior circuitry and in the mechanical elements due to shock since the shock is conveyed to the interior of a portable computer, and this is a problem for the user.

SUMMARY OF THE INVENTION

Accordingly, in order to overcome such drawbacks, it is an object of the present invention to provide a portable computer with endurance against shock by providing the portable computer with an attached a shock-absorber, by means of which shock to the external case of the portable computer is absorbed.

To achieve these and other advantages and in accordance with the purpose of the present invention, as embodied and broadly described, a portable computer with endurance against shock comprises an external case and a shock-absorber, attached thereto and covering an edge part of a cover case of the external case and an established area of the main body case.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein.

DETAILED DESCRIPTION OF PREFERRED EMBODIMENT

Figure 1:
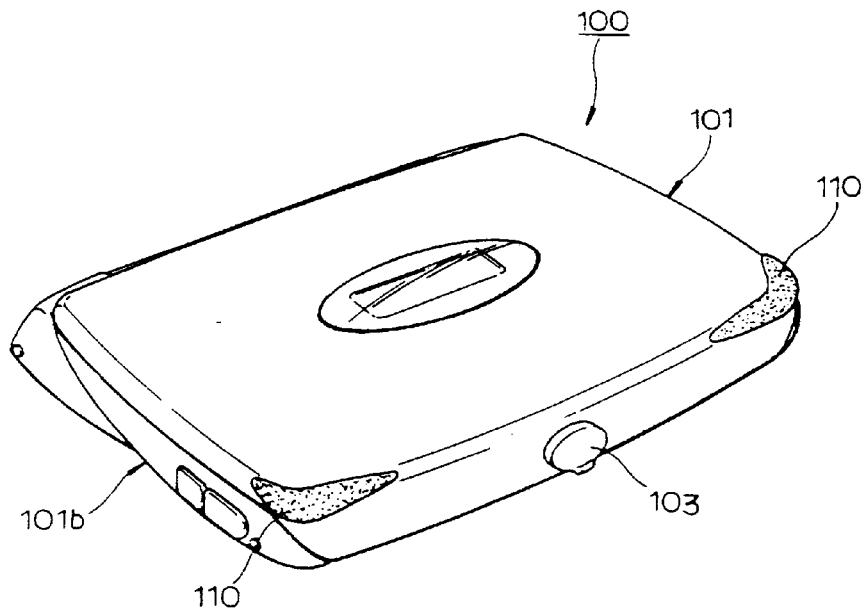
FIG. 1 is an overall perspective view of a portable computer according to this invention.
Figure 2:
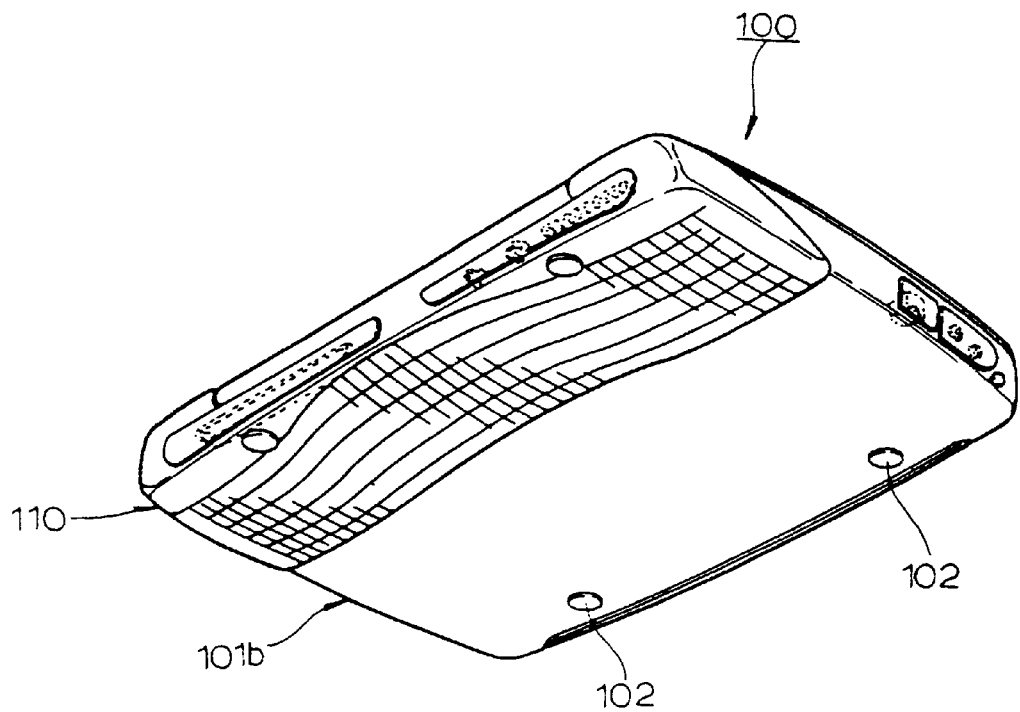
FIG. 2 is a bottom view of a portable computer as illustrated in FIG. 1.

FIG. 1 is an overall perspective view of a portable computer according to the present invention, and FIG. 2 is a bottom view of the portable computer illustrated in FIG. 1. As illustrated, a shock absorber 110 is attached to an external case 101 of a portable computer 100, and specifically to an edge part of a cover case 101a of the portable computer 100. A shock-absorber 110 is also attached to a main body case 101b in order to cover a certain other area of the external case 101.

The shock-absorber 110, formed on an edge part of the cover case 101a of the external case 101, is so attached that a front edge part of the cover case 101a can be protected with established thickness for the purpose of absorbing external shock to the edge part.

The shock-absorber 110, formed on main body case 101b of the external case 101, is so attached that it can protect an area, from a certain part of the bottom side of the main body case 101b to its back side, with established thickness. The shock-absorber 110 is preferably made of plastic material, metal material, or similar material capable of absorbing shock.

A more complete appreciation of the invention will result when considered in conjunction with the accompanying drawings.

When a portable computer 100 is not in use, locks a cover case 101a is located to main body case 101b by use of a locking lever 103. In order to use the portable computer 100 in this state, the user must open the locking lever 103 and separate cover 101a from the main body case 101b.

As mentioned previously, the portable computer 100 receives more outside shocks because the portable computer 100 is not usually installed in on established location, but rather is used in movement from place to place. This shock is exerted mostly on a bottom side of main body case 101b of the external case 101 of the portable computer 100 when the portable computer 100 is placed on an established surface in order to use it.

These shocks are conveyed to the main body case 101b and their waves are conveyed to circuitry or mechanical elements within main body case 101b. As a result, operating errors in the portable computer 100 occur.

Figure 3:
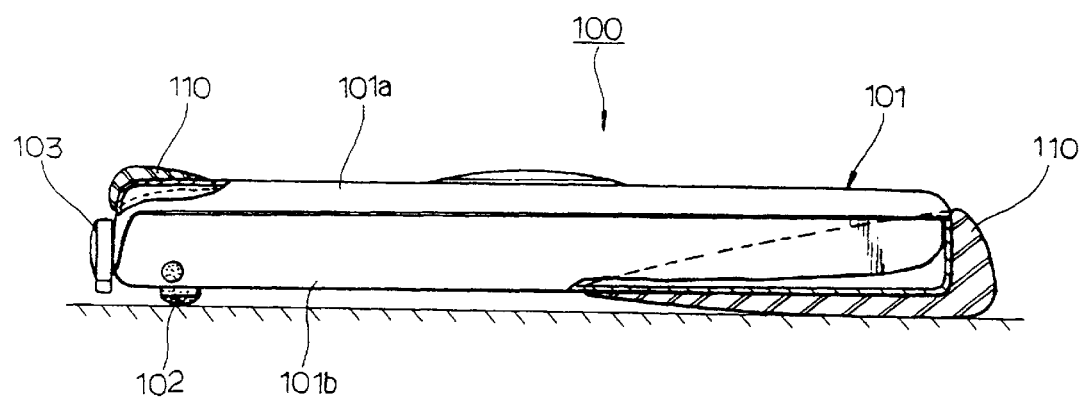
FIG. 3 is a side view of a portable computer as illustrated in FIG. 1.

In order to prevent conveyance of the shock to main body case 101b of portable computer 100, shock-absorber 100 is attached to main body case 101b, as shown in FIG. 3, from a bottom side of main body case 101b to an end point thereof which consists of a thickness of portable computer 100.

The shock-absorber 110 is formed with an established thickness, in order to absorb an established shock. Preferably, material such as plastic or metal material is used to absorb shock.

The shock which occurs when the portable computer 100 is installed in an established place can be absorbed by it because shock-absorber 110 is attached to main body case 101b with established thickness so as to be level with a support member 102 formed in a bottom side of main body case 101b.

Figure 4:
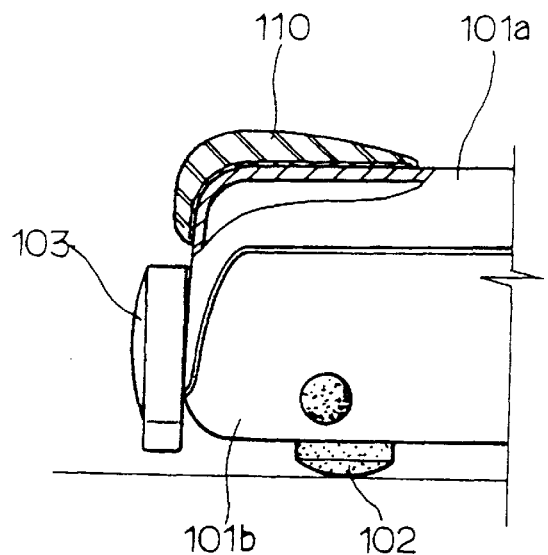
FIG. 4 is a partly enlarged side view of a portable computer as illustrated in FIG. 3.

Portable computer 100 can be bumped against an unspecific thing when moving the portable computer 100. The resultant shock occurs mostly in an edge part. In order to absorb these shocks, as shown in FIG. 4, a shock-absorber 110 is attached to cover case 101a of external cover 101 of the portable computer 100.

Namely, when portable computer 100 bumped against another object during movement, it generally happens in an edge part of external case 101 of the portable computer 100.

Such a shock occurring in an edge part of external case 101 is absorbed in the present invention by attaching shock-absorber 110 using plastic or metal materials having a certain thickness.

By attaching shock-absorber 110 to a part which receives external shock in external case 101 of the portable computer 100, the external shock can be absorbed, and portable computer 100 can be safely used.

As described in the above, the present invention can provide protection of portable computer 100 during transport by absorbing external shock to the portable computer 100, through attachment of shock-absorber 110 to external case 101 of portable computer 100.

It will be apparent to those skilled in the art that various modifications can be made in the a portable computer of the present invention without departing from the spirit of the invention. Thus, it is intended that the present invention cover such modifications, as well as variations thereof, within the scope of the appended claims and their equivalents.

What is claimed is:

1. A portable computer with endurance against shock, comprising:

an external case having a cover case and a main body case;

first-single shock-absorber formed in a single body and attached to outer surfaces of said main body case of said external case, having a bottom cover, a back cover, and two side covers, covering a portion of two side walls, a portion of back side and a first portion of a bottom side of said main body case of said external case, said bottom side cover having an established thickness; and at least one support member attached to a second portion of said bottom side of said main body case, having said established thickness for leveling said portable computer.

2. The portable computer as claimed in claim 1, further comprised of second shock-absorber attached to said cover case of said external case, covering a front edge part of said cover case.

3. The portable computer as claimed in claim 1, wherein said first-single shock-absorber is made of a material selected from a group consisting of plastic and metal material for absorbing shock.

4. The portable computer of claim 1, further comprised of said first-single shock-absorber simultaneously covering each edge part of side wall and said bottom side, and said back side and bottom side.

5. A portable computer with endurance against shock, comprising:

an external case including a cover case and a main body case;

said main body case having a front side, two sidewalls, a back side, and a bottom side;

a first shock-absorber formed in a single body and attached to outer surfaces of said main body case, having a bottom cover, back cover, and two side covers, simultaneously covering a portion of said two side walls, a portion of said back side, a first portion of said bottom side of said main body case with an established thickness; and said bottom cover having an established thickness.

6. The portable computer as claimed in claim 5, further comprised of second shock-absorber attached said cover case, covering a front edge part of said cover case with an established thickness.

7. The portable computer as claimed in claim 5, further comprised of at least a support member attached on a second portion of said bottom side of said main body case with said established thickness for leveling said portable computer.

8. The portable computer as claimed in claim 5, wherein said first shock-absorber means is made of one of a plastic material and a metal material.

9. The portable computer as claimed in claim 5, wherein a height of said back cover of said first single shock-absorber covering said back side of said main body case is longer than said back side of said main body case.

10. A portable computer with endurance against shock, comprising:

an external case including a cover case and a main body case;

first single shock-absorber formed in a single body having a bottom cover, back cover, and two side covers and attached to said main body of said external case, simultaneously covering a portion of two side walls, a portion of back side and a first portion of a bottom side of said main body case, said bottom cover having an established thickness; and at least one support member attached to a second portion of said bottom side of said main body case, having said established thickness for leveling said portable computer.

11. The portable computer as claimed in claim 10, further comprised of second shock-absorber covering a front edge part of said cover case with an established thickness.

12. The portable computer as claimed in claim 10, wherein said first single shock-absorber is made of one of a plastic material and a metal material.

13. The portable computer as claimed in claim 10, further comprised of said first shock-absorber covering each edge part of said side wall and said bottom side, and said back side and said-bottom side of said main body case.

14. The portable computer as claimed in claim 10, wherein a height of said back cover of said first single shock-absorber covering said back side of said main body case is longer than said back side of said main body case.

15. The portable computer as claimed in claim 10, wherein said thickness of said first single, shock-absorber covering said bottom side of said main body case varies with central portion and edge portion of said bottom side.

* * * * *